July 15, 1958        R. H. BELTER        2,842,868
FRONT COCKPIT INSTRUMENT FLYING HOOD
Filed Aug. 3, 1955        2 Sheets-Sheet 1
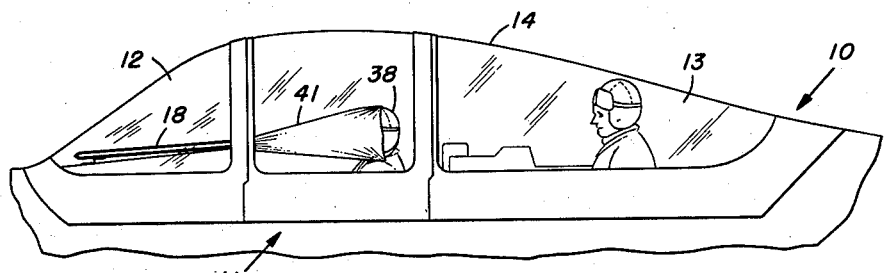
Fig. 1
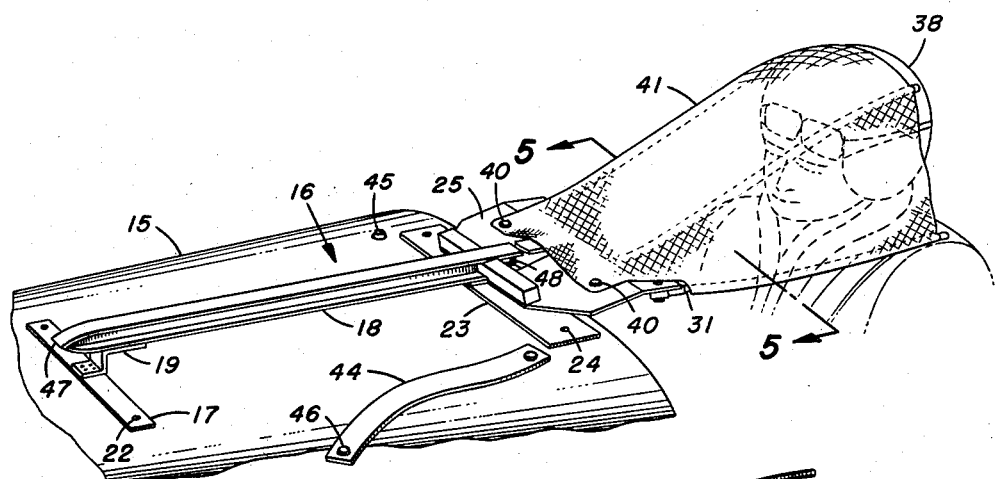
Fig. 2
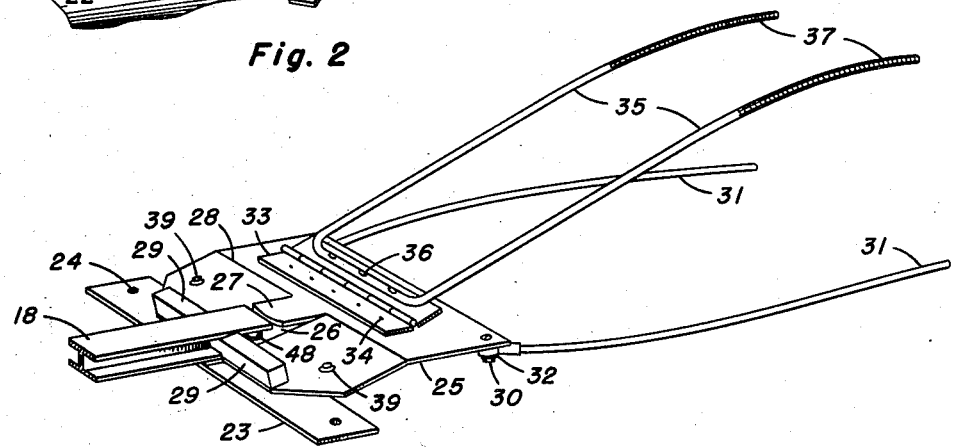
Fig. 3
INVENTOR
ROBERT H. BELTER
BY
ATTORNEYS July 15, 1958 R. H. BELTER 2,842,868
FRONT COCKPIT INSTRUMENT FLYING HOOD
Filed Aug. 3, 1955 2 Sheets-Sheet 2

INVENTOR
ROBERT H. BELTER
BY
ATTORNEYS

2,842,868
FRONT COCKPIT INSTRUMENT FLYING HOOD

Robert H. Belter, Pensacola, Fla.

Application August 3, 1955, Serial No. 526,340

5 Claims. (Cl. 35—12)

(Granted under Title 35, U. S. Code (1952), sec. 266)

The invention described herein may be manufactured and used by or for the Government of the United States of America for governmental purposes without the payment of any royalties thereon or therefor.

The present invention relates to instrument flying of aircraft, more particularly, the invention relates to a hood which limits a student pilot's vision to the instruments used in piloting an aircraft and which precludes from the pilot's vision the view exterior of the cockpit. A feature of the hood of the present invention is that it may be stowed conveniently and positively held in stowed position when not in use, thus the aircraft may undergo any change of attitude without disturbing the stowed hood. The hood also provides little or no obstruction to the instructor's vision forward, the instructor being seated in the rear cockpit of the aircraft.

An object of the present invention is to provide a front cockpit blind flying hood for student pilots wherein the hood precludes from the student pilot's vision everything exterior of the aircraft while not interfering with the instructor's forward vision.

Another object is to provide a front cockpit blind flying hood which is conveniently and positively fastened in stowed position when not in use.

Still another object is to provide a front cockpit blind flying hood which may be permanently fastened in the aircraft for sliding movement into and out of operative position.

A further object is to provide a blind flying hood which is light in weight and causes while in operative position no interference to the normal motions of the student pilot.

Other objects and many of the attendant advantages of this invention will be readily appreciated as the same becomes better understood by reference to the following detailed description when considered in connection with the accompanying drawings wherein:

Fig. 1 is a fragmentary side elevation view of cockpit area of an aircraft and showing the hood of the present invention in use;

Fig. 2 is a perspective view of the hood of the present invention in operative position with respect to the pilot and showing the mounting structure therefor;

Fig. 3 is a perspective view of the frame portion of the invention and showing the hood removed;

Figure 4:
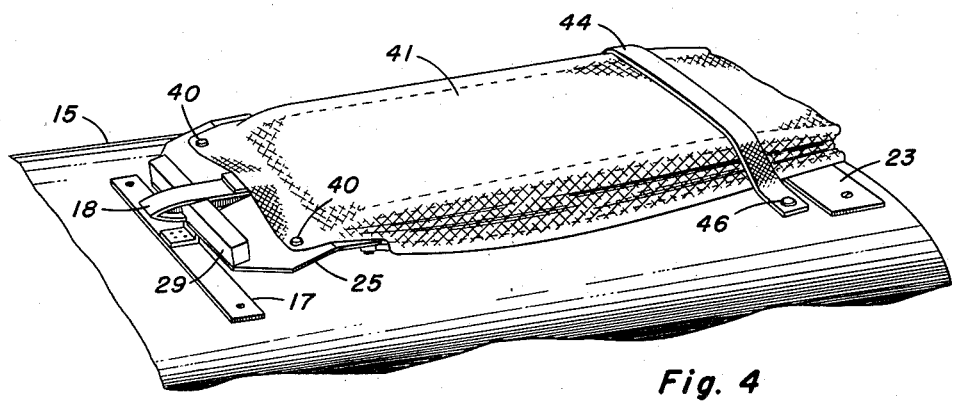
Fig. 4 is a perspective view showing the device in stowed position.
Figure 5:
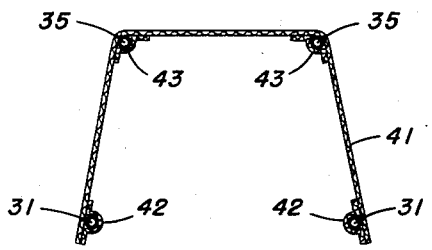
Fig. 5 is a sectional view taken along the line 5—5 of Fig. 2.
Figure 6:
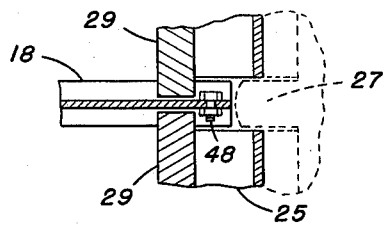
Fig. 6 is a horizontal sectional view through the I-bar showing the means for retaining the fingers of the frame in the channels thereof.

Referring more particularly to the drawings wherein like numerals indicate like parts throughout the several views, 10 indicates a portion of an aircraft provided with a cockpit area 11 having a forward portion 12 occupied by a student pilot and an aft portion 13 occupied by an instructor. The cockpit area is covered by the usual transparent canopy 14.

Mounted on the cowling 15 over forward instrument panel is a hood supporting structure 16 which is supported at the forward end thereof adjacent the windshield by a plate 17 to which an elongated I-shaped track bar 18 is secured by means of bracket 19.

Plate 17 may be secured to the cowling by screws 22 which may be screws already in use in the cowling. A plate 23 is mounted at the other end of track bar 18 on cowling 15, and is secured thereto by screws 24, which may also be screws already in use in the cowling.

Slidably mounted on the I-bar 18 is a slide plate 25 having a guide slot 26 cut therein from the leading edge thereof and through which bar 18 passes. A tab 27 is struck up at an angle from the inner end of slot 26 and rests on the upper surface of bar 18. The rear portion of plate 25 is bent downwardly at a slight angle along the line 28. A pair of oppositely disposed fingers 29 are fastened along the leading edge of plate 25 on opposite sides of slot 26 and are adapted to ride in the channels on the sides of I-bar 18. When plate 25 is at the end position adjacent plate 23, tab 27 drops down to engage the end of I-bar 18 thus to hold plate 25 against accidental forward motion.

Mounted at the rear corners of plate 25 by means of bolts and lock nuts 30 are a pair of slightly bowed tubular arms or lower frame members 31. Arms 31 may be pivoted in order to adjust to the shoulders of the individual student pilot. Spring washers 32 are interposed between the nuts 30 and the underside of arms 31 in order to maintain ams 31 in adjusted position.

A hinge member 33 is fastened to plate 25 by suitable fastening means 34. A substantially U-shaped tubular frame member 35 is fastened by suitable fastening means 36 to hinge member 33 thus to provide for raising and lowering member 35. Spring members 37 are secured to the ends of U-shaped frame member 35 and form extensions thereof. Springs 37 may be curved to conform to the curvature of the helmet 38 of the student pilot.

A pair of male fastener elements 39 are fixed on opposite sides of plate 25 forward of hinge 33. A hood 41 formed of opaque flexible material such as rubberized fabric is provided with pockets 42 running along the lower edges thereof to receive the tubular arms 31 forming the lower frame and pockets 43 running along the upper portion thereof to receive the tubular arms of U-shaped member 35 and the spring extensions 37 thereof. If desired, that portion of the hood 41 in contact with the helmet 38 may be lined with a smooth hard finish fabric (not shown) to avoid friction with the helmet, thus to permit free motion of the helmet with respect to the hood. A pair of female snap fastener elements 40 are mounted on the forward end of hood 41 and engage male fastener elements 39.

It will be apparent that the aforedescribed structure presents a hood for blind flying which is light in weight, to assure the comfort of the pilot and which causes little or no interference to the motions of the pilot while piloting the aircraft, by reason of the pivotal and hinged connections of the frame members and the spring ends of the upper frame members.

As heretofore stated, the hood may be stowed on the cowling between the windshield and instrument panel of the aircraft by sliding plate 25 forward on fingers 29 along I-bar 18 until the fingers reach the end of I-bar 18 whereupon hood 41 and the frame members 35 and 31 thereof are folded substantially flat. In order to maintain the hood assembly in stowed position a strap 44 is provided, male fastener elements 45 being secured to the cowling of the aircraft and female fastener elements 46 being fixed to the opposite ends of strap 44, thus the strap passes laterally across the hood assembly and is fastened at both ends. The hood when stowed away is thus firmly secured to prevent accidental movement thereof to obstruct the pilot's vision during stunt flying or other unusual changes of attitude of the aircraft.

It is also clear that the hood conforms closely to the configuration of the student pilot's helmet, thus the forward view of the instructor, sitting in the rear cockpit, is not reduced materially.

Front end of track bar 18 is closed as at 47 while the other end is provided with a nut and bolt 48 mounted on the vertical run of the I-bar to prevent sliding motion of the fingers 29 beyond the limits of bar 18, the nut and bolt 48 being removable to provide for disassembly of plate 25 from the track bar 18.

Obviously many modifications and variations of the present invention are possible in the light of the above teachings. It is therefore to be understood that within the scope of the appended claims the invention may be practiced otherwise than as specifically described.

What is claimed is:

1. A hood for instrument flying in the front student pilot's cockpit of an aircraft having an instructor's cockpit therebehind comprising, a track member fixed to the aircraft and disposed lengthwise of the aircraft ahead of the front cockpit, a sliding plate mounted on said track for slidable motion from one end of the track to the other end thereof, an upper frame member hingedly mounted on said sliding plate for vertically swinging motion with respect thereto, lower frame members pivotally mounted on said sliding plate for laterally swinging motion with respect thereto, an opaque cover mounted on said upper and lower frame members, female fastening elements secured to said sliding plate, male fastening elements fixed to the forward end of said cover and adapted to engage said female fastening elements whereby said cover is removably secured to said sliding plate, said sliding plate, frame and cover being adapted to be moved rearwardly into operative position with respect to the student pilot and to be moved forwardly to a stowed position wherein the frame and cover are folded substantially flat, and means for fastening said sliding plate, frame and cover in stowed position.

2. A hood for instrument flying of aircraft comprising, a track member having an I-shaped cross-section and fixedly mounted in said aircraft, a supporting plate, a pair of fingers mounted on said supporting plate and engaging the channels of said I-shaped track member for sliding motion thereon, frame members pivotally mounted on said supporting plate and adapted to be pivoted from an operative position to a substantially flat position, an opaque hood member mounted on said frame members and adapted to engage the helmet and shoulders of the pilot of said aircraft when in operative position and to fold substantially flat when in a stowed position, said plate, frame and hood member being slidable on said track member rearwardly to the operative position and forwardly to the stowed position, and means on said supporting plate and engaging the rear end of said track member for releasably holding said plate and hood member in operative position.

3. A hood for instrument flying of aircraft comprising, a track member fixed to said aircraft, a supporting plate slidably mounted on said track member, a substantially U-shaped upper frame member pivoted on said plate for vertical motion, yieldable extensions mounted on the ends of said U-shaped frame member, a pair of lower frame members pivoted on said plate for lateral motion, an opaque hood member supported on said frame members for restricting the view of the pilot to the instrument panel of the aircraft, said yieldable extensions being in that portion of the hood member engaging the pilot's helmet, the lower frame members being in that portion of the hood member engaging the pilot's shoulders, and means for fastening said hood member to said supporting plate.

4. A hood for instrument flying in the front student pilot's cockpit of an aircraft having an instructor's cockpit therebehind comprising, a track member fixed to the aircraft and disposed lengthwise of the aircraft ahead of the front cockpit, a sliding plate mounted on said track for slidable motion from one end of the track to the other end thereof, an upper frame member hingedly mounted on said sliding plate for vertically swinging motion with respect thereto, lower frame members pivotally mounted on said sliding plate for laterally swinging motion with respect thereto, and a vision restricting cover mounted on said upper and lower frame members.

5. A hood for instrument flying of aircraft comprising frame means having upper and lower longitudinally extending frame members, means fixed to said aircraft for slidably mounting said frame members, said upper frame members being hingedly mounted on said slidable means for vertically swinging movement with respect thereto, said lower frame members being pivotally mounted on said slidable means for laterally swinging movement with respect thereto, the rear ends of said frame members adapted to rest on parts of the aircraft pilot's body, a flexible hood mounted on said frame members whereby said flexible hood is adapted to be moved rearwardly into operative engagement with said pilot and moved forwardly out of operative engagement with said pilot to a collapsed stowed position.

References Cited in the file of this patent

UNITED STATES PATENTS

| 703,655 | Happold | July 1, 1902 |
| 1,675,055 | Seheide | June 26, 1928 |
| 2,090,132 | Lacoe | Aug. 17, 1937 |
| 2,722,059 | Neiswander | Nov. 1, 1955 |

OTHER REFERENCES

Ocker: Instrument Flying To Combat Fog, Scientific American, December 1930, page 430.